(12) United States Patent
Schaller

(10) Patent No.: US 6,590,712 B2
(45) Date of Patent: Jul. 8, 2003

(54) ARRANGEMENT AND METHOD FOR GENERATING A PLURALITY OF OPTICAL AXES WHICH ARE ORIENTED IN A DEFINED MANNER RELATIVE TO ONE ANOTHER

(75) Inventor: Uwe Schaller, Kahla (DE)

(73) Assignee: Hilti Aktiengesellschaft, Fuerstentum (LI)

( * ) Notice: Subject to any disclaimer, the term of this patent is extended or adjusted under 35 U.S.C. 154(b) by 0 days.

(21) Appl. No.: 10/091,155

(22) Filed: Mar. 4, 2002

(65) Prior Publication Data

US 2002/0126388 A1 Sep. 12, 2002

(30) Foreign Application Priority Data

Mar. 9, 2001 (DE) .......................... 101 12 024

(51) Int. Cl.[7] .............................................. G02B 27/10
(52) U.S. Cl. .................. 359/618; 359/618; 359/741; 359/641; 359/822
(58) Field of Search ................ 359/618, 624, 359/664, 850, 855, 811, 819, 820, 822, 741, 742, 743, 641, 583, 629; 396/526; 362/455; 353/100; 356/138

(56) References Cited

U.S. PATENT DOCUMENTS 6,193,801 B1 * 2/2001 Hooker et al. .............. 118/500
6,282,028 B1 * 8/2001 Waibel et al. .............. 359/618

* cited by examiner

Primary Examiner—Hung Xuan Dang
Assistant Examiner—Joseph P Martinez
(74) Attorney, Agent, or Firm—Reed Smith LLP

(57) ABSTRACT

An arrangement and a method for generating a plurality of optical axes which are oriented in a defined manner relative to one another in which the directions of the optical axes are defined by the reflection angles of a light bundle at plane mirror surfaces arranged in different ways. The object of the invention, to find a novel possibility for generating a plurality of optical axes oriented in a defined manner relative to one another using plane mirror surfaces which allows an accurate orientation of the optical axes independent from manufacturing tolerances of the components for holding the mirrors and a simple final adjustment, is met in that the plane mirror surfaces are arranged on the section face of spherical segments, and every spherical segment is embedded with its spherical cap in a recess of a base body, wherein the outside surface of the recess allows only those contact points between the spherical cap of the spherical segment and the recess which constitute an invariable pattern of contact points which is not dependent on the orientation of the mirror surface, and the spherical segments are rigidly fixed in the recesses of the base body by a connection layer after they have been adjusted corresponding to the optical axes to be aligned by means of a template.

40 Claims, 8 Drawing Sheets

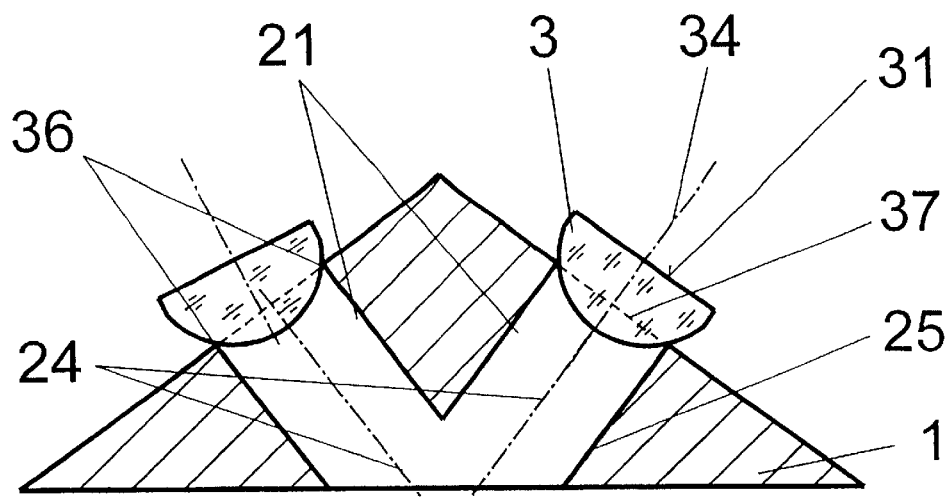
Fig. 2
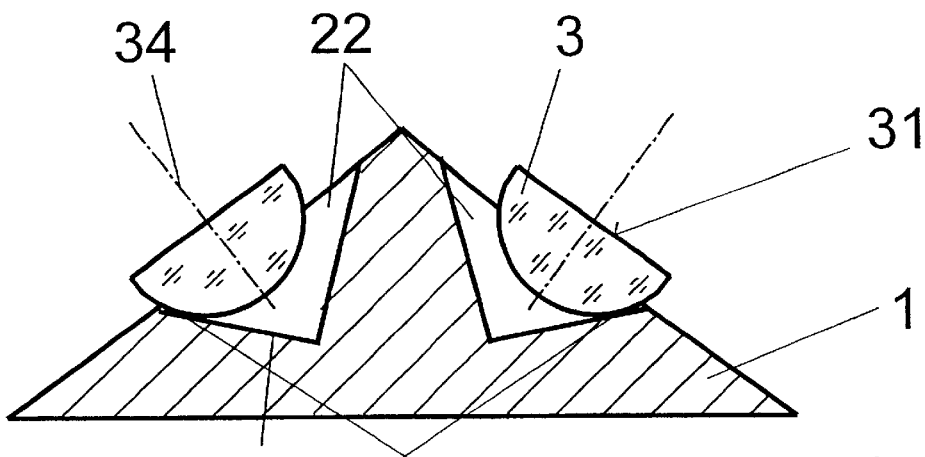
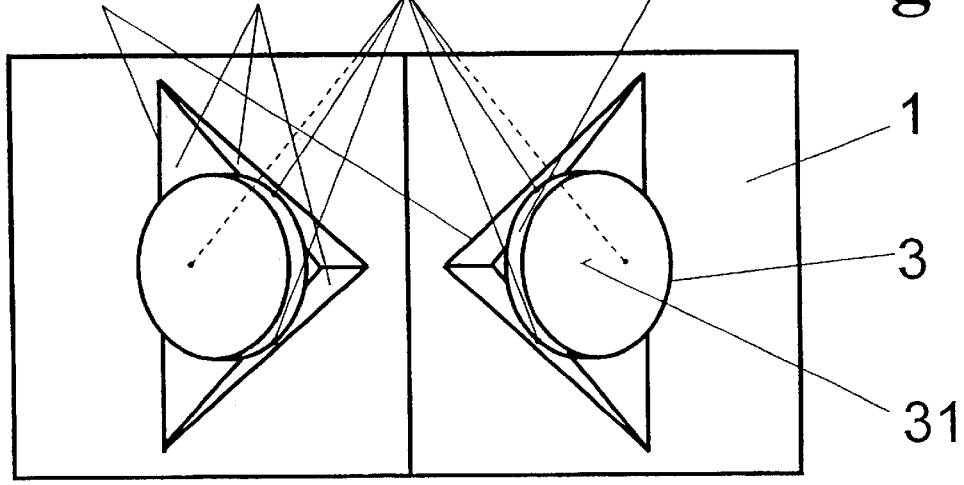
Fig. 3

ARRANGEMENT AND METHOD FOR GENERATING A PLURALITY OF OPTICAL AXES WHICH ARE ORIENTED IN A DEFINED MANNER RELATIVE TO ONE ANOTHER

CROSS-REFERENCE TO RELATED APPLICATIONS

This application claims priority of German Application Serial No. 101 12 024.9, filed Mar. 9, 2001, the complete disclosure of which is hereby incorporated by reference.

BACKGROUND OF THE INVENTION a) Field of the Invention

The invention is directed to an arrangement and method for generating a plurality of optical axes which are oriented in a defined manner relative to one another in which the directions of the optical axes are defined by the reflection angles of a light bundle at plane mirror surfaces arranged in different ways. It is suitable particularly for the production of laser plummets with a plurality of orthogonal axes and similar measurement instruments for the construction industry, but also offers many possible applications for aligning beam paths to be divided in a desired way in optical precision measurement instruments.

b) Description of the Related Art

Table systems and frame systems are known generally from the prior art for mirror adjustments. These table and frame systems which serve as supports for mirror surfaces are actuated mechanically by adjustment screws or piezo-electrically when the desired beam path of a light bundle is directed for the first time (or after repeated readjustments) to a target point by switching on the light sources being used. This procedure is likewise common in laser plummets for the construction industry, wherein the type of beam splitting and beam orientation is solved in different ways.

U.S. Pat. No. 4,912,851 discloses a level/plumb indicator in which the exact 90-degree orientation of a horizontal exit beam relative to the original vertical direction of the collimated laser beam is achieved by a two-mirror orthogonal reflector (penta prism). The vertical direction is generated by swiveling the reflector out of the laser beam. This solution has the decisive disadvantage that the two orthogonal exit beams are only available alternatively.

A similar portable laser device for orientation purposes is described in U.S. Pat. No. 5,144,487 in which (up to five) exit beams can be provided simultaneously in vertical, horizontal and orthogonal direction in that collimated light from a laser diode is split into a corresponding number of exit beams through an optical system. A projection unit comprising a laser diode, collimator and optical system is suspended in pendulum fashion such that at least one beam is oriented horizontally and other beams are oriented vertically or at right angles thereto. For purposes of beam splitting, the optical system contains at least one partially reflecting mirror which must be exactly adjusted, wherein small indicators are provided by the manner in which the partially reflecting mirror is oriented in an exactly reproducible manner, requiring a time-consuming final adjustment with reference to the target marks.

Another solution to the set of problems in multiple-axis laser sighting instruments is known from U.S. Pat. No. 6,005,716. In this case, the elliptic beam shape typical of laser diodes is deliberately used to direct the collimated elliptic light bundle in three adjacent circular bundles to three mirrors which are arranged directly next to one another in a plane and which are variously inclined by 45° in three different directions, the middle mirror being partially transparent. This results in four orthogonal beam bundles. A fifth beam is added by inserting another partially reflecting mirror in the beam path of the beam reflected at the first partially reflecting mirror and reflects the beam bundle in the opposite direction. The different intensity of the orthogonal bundles resulting from the multiple division of individual beam bundles is disadvantageous. Further, the orientation of the individual mirror surfaces in this solution is also still time-consuming and this patent indicates neither the manner of holding the mirrors nor the procedure for suitable adjustment.

OBJECT AND SUMMARY OF THE INVENTION

It is the primary object of the invention to find a novel possibility for generating a plurality of optical axes oriented in a defined manner relative to one another using plane mirror surfaces which allows desired accurate orientation of the optical axes independent from manufacturing tolerances of the components for holding the mirrors and a simple and stable final adjustment.

According to the invention, in an arrangement for generating a plurality of optical axes oriented in a defined manner relative to one another in which the optical axes are defined by the reflection angles of a light bundle at plane mirror surfaces arranged in different ways, the above-stated object is met in that the plane mirror surfaces are arranged on the section face of spherical segments, wherein every spherical segment always includes a spherical cap and a plane circle face and the axis of symmetry of the spherical segment extended beyond the circle face is a mirror surface normal, in that every spherical segment is embedded with its spherical cap in a recess of a base body, wherein the recess has a center axis, which is essentially adapted to the direction of the mirror surface normal required for the orientation of the optical axis, and an outside surface, and there are contact points between the spherical cap of the spherical segment and the outside surface of the recess, which contact points constitute an invariable pattern of contact points which is not dependent on the orientation of the mirror surface, and in that the spherical segments are rigidly fixed in the recesses of the base body, at least at the contact points, by means of a connection layer, wherein the plane mirror surfaces can be adjusted with the desired degree of accuracy prior to the final fixing of the connection layer corresponding to the optical axes to be aligned.

Every spherical segment is advisably provided with a mirror layer on its plane section face.

In order to limit the reflected light bundle in a defined manner, it is advantageous when the section face is covered by a mirror layer, wherein a sharply defined edge area is provided as a diaphragm. The mirror layer is preferably vapor-deposited on the section face. The edge area provided as diaphragm can be excluded from the vapor deposition or may be coated subsequently in addition. The spherical segments which carry the mirror surfaces are advisably half-spheres for reasons of simple manufacture. However, one-quarter spheres to three-quarter spheres may also be useful, depending on the needed size of the variance range of the angle for orienting the mirror surface.

The recesses for receiving the spherical segments in the base body are conical in one preferred variant; in this case, the invariable pattern of contact points between the outside surface of the conical recess and the spherical cap of an embedded spherical segment is a closed circular line.

It is also possible for the recesses to be shaped as regular pyramids, wherein the invariable pattern of the contact points would ideally be the corner points of an n-angle, when n is the quantity of lateral surfaces of the pyramid. Concretely, however (for reasons of manufacturing tolerances of n-sided pyramid-shaped recesses), the pattern of the contact points is a plane pattern with fewer than n corners, so that actually only the three-sided pyramid is useful for safely preventing tilting movements when orienting the spherical segments in the recess of the pyramid-shaped recesses. The points of contact with the spherical cap of the spherical segment which are located on a surface line of the lateral surfaces of the three-sided pyramid-shaped recess, even when deviating from the ideal shape of a regular pyramid, constitute a virtually equilateral triangle, but in any case a constant triangle representing a definite three-point bearing for the spherical cap.

For every optical axis to be aligned, the base body should advisably have a suitable surface portion for arranging the above-mentioned recess, wherein the surface normal of every such surface portion in the area of the recess should be essentially adapted as far as possible to the required direction of the mirror surface normals for orientation of the optical axes. This step facilitates access to the mirror surfaces during adjustment.

In order for a plurality of beam bundles to be oriented in desired manner within a plane orthogonal to the direction of the incident light bundle, the base body is preferably a cone, wherein the recesses can be introduced, always vertically, in the outside surface of the cone so as to be distributed in a desired manner.

In order to orient a plurality of beam bundles in different optical axes which are arranged relative to one another in a manner (usually regular) known beforehand, a base body with plane surfaces is advantageously used, wherein the plane surfaces are so aligned with respect to their position relative to an incident light bundle that they are again essentially parallel to the mirror surfaces to be arranged subsequently.

For purposes of an even distribution of a plurality of beam bundles within a plane orthogonal to the direction of the incident light bundle, the base body can advisably be a pyramid with n sides, where n is the quantity of beam bundles whose optical axes are to be aligned in a plane. When there are four beam bundles which are to be oriented within a plane and which are to be orthogonal to the direction of the incident light bundle and relative to one another, the base body is then advantageously a straight-line square pyramid.

When the surface portions at the base body for arranging the recesses are plane surfaces, this offers another shape possibility for the recesses. Cylindrical recesses are also suitable in this case, wherein the cylindrical recess has a diameter smaller than that of the associated spherical segment, so that the invariable pattern of the contact points is a circle at the upper edge of the cylindrical recess.

For simultaneous illumination of all of the mirror surfaces located on the outside surface of the base body, a light source is advisably provided which has a collimated light bundle extending symmetrically along the axis of symmetry of the base body, wherein the light source is arranged above the tip of the pyramid-shaped or conical base body. The same result is achieved when a light source is arranged below the outside surface of the base body, wherein the base body has a central symmetric opening through which the beam bundle of the light source is directed and a reflecting collimator which reflects the beam bundle proceeding from the light source onto the mirror surfaces in a collimated manner is arranged above the tip of the base body.

When the collimator is a collimator objective for collimating incident light for both transmission and reflection, there is the further advantage that, apart from the light bundles which are reflected within a plane (and which may also be oriented orthogonal to one another), another output beam bundle is oriented orthogonal to the reflected light bundles. This configuration is particularly relevant for the 5-axis configuration of laser plummets described in detail in the following. The collimator objective preferably has a mirror layer on a lens surface, wherein the mirror layer has a window in the area of the optical axis of the collimator objective for transmitting a limited light bundle. The window for the transmitted light bundle can advisably have a circular opening or a square opening.

In order to generate five orthogonal optical axes (using the above-mentioned transmission/reflection collimator), the central symmetric opening in the interior of the (preferably pyramid-shaped or conical) base body expands in the area of the base surface into a larger cylindrical countersunk bore hole with a conical end, and the light source which is embedded in a spherical holder for adjustment of the radiating characteristic is rotatably mounted in this countersunk bore hole. In this way, the light source can be accommodated in a space-saving manner and adjusted simply.

In order to simplify manufacture of the base body with the central recess, which is advisable for technical reasons relating to illumination, the base body can also be a truncated cone or truncated pyramid, wherein the opening is located between the top surface and the base surface so that a central portion of the light bundle proceeding from the light source can pass through unimpeded.

In order to align six light bundles in six directions orthogonal to one another (6-axis plummet), the base body advantageously comprises two congruent partial bodies with plane base surfaces. In this case, the partial bodies are arranged along a common center axis, have an outside surface which is inclined relative to the base surface and which is provided for introducing three recesses for the reflecting spherical segments, these recesses being evenly distributed about the common center axis of the partial body, and have base surfaces which are located opposite one another in a parallel manner and which are connected with one another in such a way that every two recesses situated in different partial bodies have center axes along one and the same straight line, and the optical axes of the reflected light bundles of all reflecting spherical segments have a common virtual point of intersection in the center of the assembled base body. Further, the mirror surfaces of the spherical segments in every partial body are illuminated by a light source having a collimated incident light bundle along the common center axis of the partial bodies.

The two-part base body preferably comprises two rotationally symmetric partial bodies with plane base surfaces. The partial bodies are preferably two cones or spherical segments. However, the base body can also comprise two three-sided pyramids whose parallel base surfaces are rotated by 60° relative to one another about the common center axis of the partial bodies.

For advantageous illumination and suitable enclosure of the optical components for the 6-axis plummet configuration described above, a cube-shaped housing is advisably arranged around the base body, wherein the base body is positioned with its center axis along a body diagonal of the cube and point-symmetric with respect to the center of the cube, and two opposed, incident, collimated light bundles are provided along said body diagonal for illuminating the mirror surfaces of a partial body of the base body, wherein the mirror surfaces of every partial body are so aligned that each light bundle reflected by the mirror surfaces of a partial body traverses orthogonally and centrally one of the cube surfaces adjacent to the incident light bundle.

In a method for generating a plurality of optical axes that are oriented in a defined manner relative to one another, in which a reflected light bundle is generated from a collimated incident light bundle proceeding from a light source by means of the orientation of adjustable plane mirror surfaces, wherein the direction of the optical axes is adjusted by means of the reflection angle of the respective mirror surface relative to the incident light bundle, the object of the invention is further met by the following steps:

producing carrier bodies for mirror surfaces, wherein spheres are divided into spherical segments by plane cuts, resulting in spherical segments with a spherical cap and a circular surface, arranging a mirror layer on the circular surface of the spherical segments, wherein the axis of symmetry of the spherical segment above the mirror surface is a mirror surface normal with respect to the optical axis to be aligned, producing a base body, wherein a recess with a center axis and a non-spherical outside surface is so introduced in the surface of the base body for every optical axis to be aligned that the center axis of the recess is adapted at least approximately to the direction of the mirror surface normal required for the orientation of the optical axis, and the shape of the recesses is selected in such a way that the spherical segment is supported so that it is not displaceable but is rotatable about the center of curvature of the spherical cap, arranging a connection layer on at least one of the surfaces of the spherical cap and recess, wherein the connection layer is used for subsequent rigid fixation of the two surfaces, embedding the spherical segments with their spherical caps in the recesses of the base body, aligning the different mirror surfaces by means of a master template by which the desired orientations of the optical axes are effected through alignment surfaces, and fixing the reflecting spherical segments in the area of the contact points between the spherical cap of the spherical segment and the outside surface of the recess through rigid connection by means of the connection layer.

In particular, this method ensures a reproducible alignment of optical axes which are predetermined in a defined manner.

The recesses are advantageously introduced into the base body conically through countersunk bore holes and the spherical segments are fixed along a circular line of contact points at the conical outside surface of the recess.

However, in the case of plane surface parts of the base body, the recesses can also be introduced in the base body through cylindrical bore holes with a diameter that is smaller than the circular face of the spherical segment and the spherical segments are fixed to the upper edge of the cylindrical outside surface of the recess along a circular line of contact points.

Another way of introducing suitable recesses in the base body consists in producing the base body while simultaneously forming three-sided pyramid-shaped recesses, wherein the spherical segments are fixed around a contact point to each of the outside surfaces of the pyramid-shaped recess by the spherical cap.

In order to fix the spherical segment in the recess, a glue is advantageously applied at least at the contact points on one of the surfaces of the spherical cap or outside surface of the recess. The application of glue is advisably simplified by dipping the spherical cap in the glue.

In this respect, it is advantageous to apply a glue which is cured through application of energy after the spherical segments are adjusted. A glue which hardens by means of UV illumination and which is cured by a UV light source from the underside of the spherical segments through an access to the recesses which is arranged centrally in the base body is best suited for this purpose.

In another advantageous variant, at least the points of contact between the surfaces of the spherical cap and recess are provided with a coating which can be melted by the application of energy and which is then melted subsequent to the adjustment of the spherical segments.

Another step for fixing consists in that at least areas around the contact points of the surfaces of the spherical cap and recess are provided with a metallic coating, wherein the metallic coatings of both surfaces are melted together by laser soldering.

During adjustment, a maximum of three alignment surfaces are brought into contact with the provided mirror surfaces simultaneously by means of the master template for aligning the mirror surfaces before the mirror surfaces that are aligned in this way are deliberately made to rigidly connect the contact points by means of the connection layer introduced between the associated surfaces of the spherical cap and recess. In this way, a highly precise (definite) alignment of the mirror surfaces is ensured by a three-point contact of the template.

In order to align more than three mirror surfaces relative to one another, every additional mirror surface is adjusted and subsequently fixed by including two mirror surfaces which are already fixed.

The solution (arrangement and method), according to the invention, makes it possible to generate a plurality of optical axes oriented relative to one another in a defined manner by using plane mirror surfaces which can be aligned with any desired accuracy regardless of the manufacturing tolerances of the components for holding the mirrors and permit a simple and stable final adjustment of the mirror surfaces.

The invention will be described more fully in the following with reference to embodiment examples.

BRIEF DESCRIPTION OF THE DRAWINGS

In the drawings:

FIG. 2 shows a variant for cylindrical recesses in the base body;

FIG. 3 shows a variant with pyramid-shaped recesses in the base body;

DESCRIPTION OF THE PREFERRED EMBODIMENTS

Figure 1:
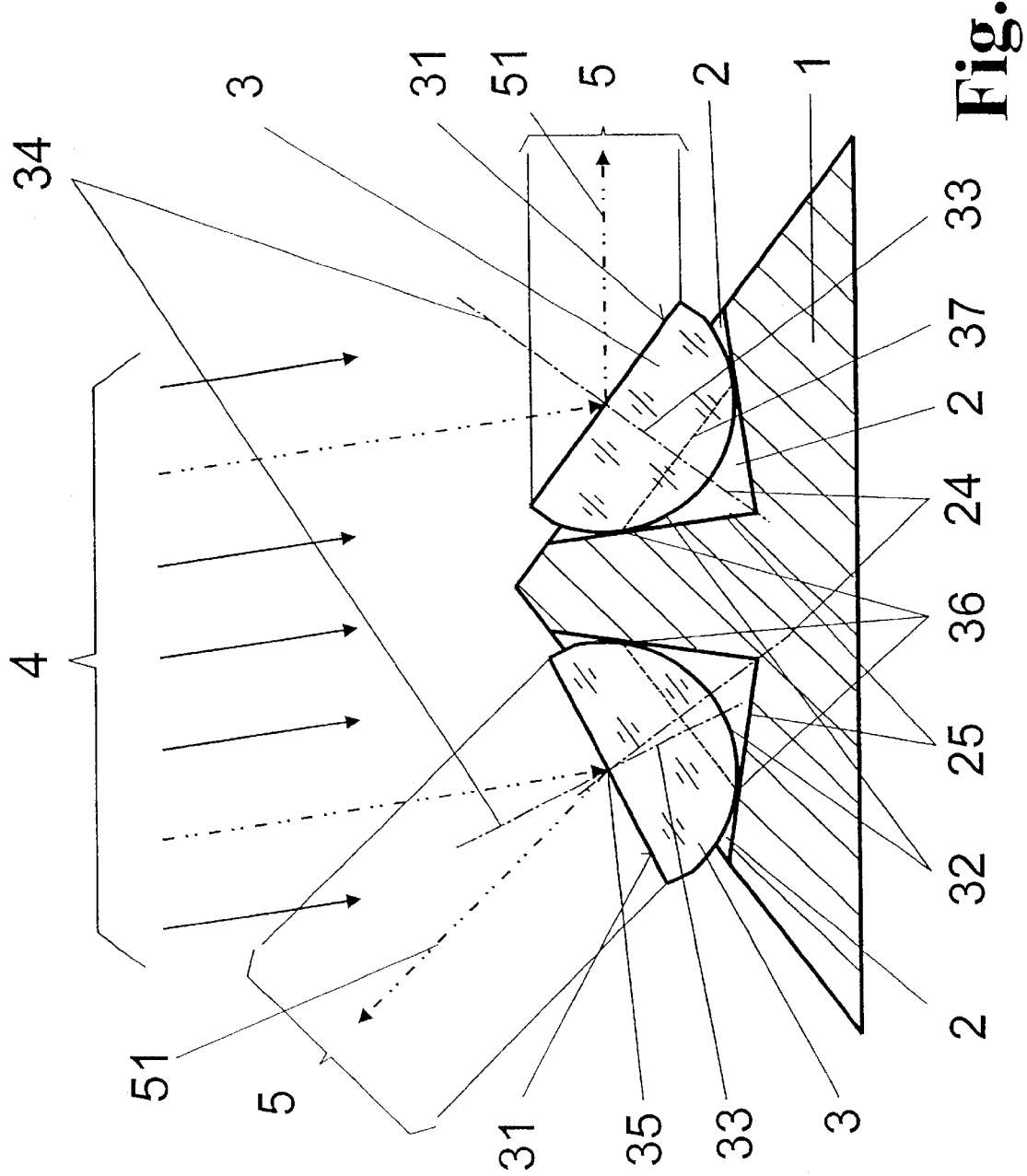
FIG. 1 shows a schematic view of the arrangement according to the invention with two mirror surfaces.

In its basic construction, the solution according to the invention—as is shown schematically in FIG. 1—comprises a base body 1 with recesses 2 for receiving spherical segments 3, wherein mirror surfaces 31 are arranged on its plane section faces. The spherical segments 3 offer the special advantage for the holding arrangement of the mirror surface 31 that both the mirror surface 31 and its carrier body (spherical segment 3) have the same axis of symmetry 33 which, serving at the same time as a mirror surface normal 34, represents the incident normal for an incident light bundle 4 at a determined incident angle 41 (other than zero). The mirror surfaces 31 themselves are to be arranged in a simple manner on the section face of the spherical segment 3 with a very exact edge boundary because the circular edge between the section face and the spherical cap 32 is directly available for this purpose. A mirror layer is advisably vapor-deposited.

The object of the mirror surfaces 31 is to generate light bundles 5 (also designated hereinafter as optical axes 51 because of the primacy of directional representation) from an incident light bundle 4 with great accuracy, which light bundles 5 are reflected in predetermined directions. For this purpose, the recesses 2 are provided in the base body 1 in such a way that the spherical cap 32 of a spherical segment 3 has exclusively degrees of freedom of rotation in the recess and is accordingly freely rotatable about its center of curvature 35 (in a defined angular area) as long as it is not rigidly connected by a suitable connection layer 38 at its contact points 36 with the outside surface 25 of the recess 2. The recesses 2 are constructed in such a way that the contact points 363 are distributed as evenly as possible and result in a non-redundant support of the spherical cap 32 of the reflecting spherical segment.

The simplest solution (above all in technical respects relating to manufacture) with a conically shaped recess 2 is indicated in FIG. 1. The contact points 36 connect to form a line 37 in the form of a circular line. The alignment of the center axes 24 of the recesses 2 are already adapted to a great extent to the subsequent orientation of the mirror normals 34 of the respective mirror surface 31 in order to prevent the spherical cap 3 from slipping out of the recess 2 of the base body 1 during the subsequent orientation (under pressure) and fixation of the spherical segments 3.

An incident light bundle 4 which impinges on a plurality of mirror surfaces 31 simultaneously can accordingly be divided into a plurality of reflected light bundles 5 whose optical axes 51 are aligned within a large area, and can be fixed subsequently, by means of the mirror surfaces 31, each of which is supported on the spherical cap 32 of the mirror segment 3 so as to be rotatable in the recess 2. The possibilities for fixation are described in more detail in the following.

FIG. 2 shows another support variant with the same possibilities for rotation and alignment of the reflecting spherical segments 3 as those described in FIG. 1. In this case, the base body 1 has cylindrical recesses 21. The orientation of the center axes 24 of the cylindrical recess 21 are likewise adapted as far as possible to the subsequent orientation of the mirror normals 34 of the mirror surface 31. The diameter of the cylindrical recesses 21 is selected in such a way that it is smaller than the diameter of the spherical segment 3. The spherical cap 32 of the spherical segment 3 therefore slides on the upper edge of the outside surface 25 of the cylindrical recess 21. The contact points 36 between the recess 21 and spherical cap 32 again form a closed circular line 37.

FIG. 3 contains a sectional view and a top view of a base body 1 in the form of a three-sided prism. The latter has a suitable shape for the alignment, according to the invention, of two optical axes 51. In this example, the recesses 2 in the base body 1 are arranged as pyramid-shaped recesses 22, wherein a three-sided pyramid-shaped recess 22 is advisable because of the non-tilting support of the spherical cap 32 in the recess 22. All regular n-sided pyramid shapes are equally suitable in theory, but are not all advisable in view of the limited manufacturing precision and overdefined n-point support of the spherical cap 32 on n outside surfaces 25. In the case of the three-sided pyramid-shaped recess 22, on the other hand, exact regularity of the pyramid shape is not as critical because the resulting contact of the spherical cap 32 with the sides of the outside surface 25 of the pyramid-shaped recess 22 in only three contact points 36 always leads to a defined support of the spherical cap 32. In the ideal (regular) three-sided pyramid-shaped recess 22, the contact points 36 of the spherical cap 32 lie on the center surface line of the three sides of the outside surface 25 as can be seen from the lower top view shown in FIG. 3.

Figure 4:
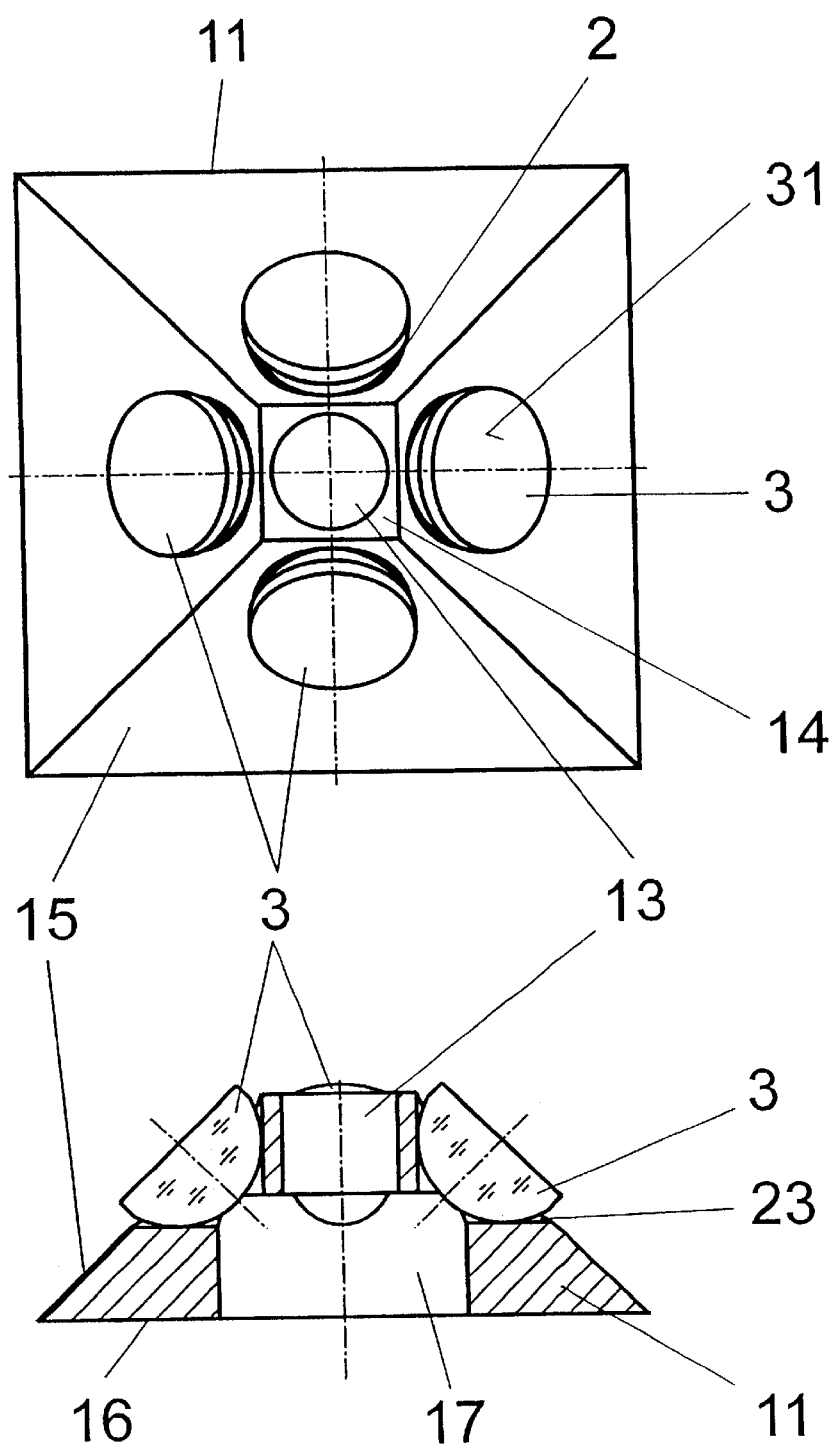
FIG. 4 is a top view in section showing a square pyramid as a shape of the base body.

FIG. 4 shows an example for the alignment of four optical axes 51 in a top view and a sectional view. The alignment should be effected within a plane, wherein the optical axes 51 are orthogonal to one another. The incident bundle 4 (not shown) impinges vertical to the drawing plane of the top view and parallel to the center axis (identical to the axis of symmetry in FIG. 4) of the base body 1 in the bottom sectional view. An advisable base body 1 for four orthogonal optical axes 51 is a four-sided square pyramid 11, wherein each of the four sides of the outside surface 15 of the pyramid 11 contains a recess 2 for incorporating the reflecting spherical segments 3. The sides of the outside surface 15 of the pyramid 11 are preferably inclined at an angle of 45° to the bottom surface 16 of the pyramid 11 and open into a top surface 14 which actually changes the base body 16 to a truncated pyramid. However, the cut off tip of the pyramid 11 serves exclusively for a further development of the arrangement according to the invention in that a central opening 13 (in the shape of a hollow cylinder) is arranged in the pyramid 11 to enable a limited (central) portion of the incident light bundle 4 to pass through. Accordingly, the variant of the base body in the shape of a pyramid 11 offers the possibility of generating five orthogonal optical axes 51, wherein four reflected light bundles 5 lie in a plane parallel to the base surface 16 of the pyramid 11 and a transmitted portion of the incident light bundle 4 is vertical to this plane of the reflected light bundle 5.

As will be seen from the sectional view at the bottom of FIG. 3, the recesses 2 are constructed as conical recesses 23 and are advisably arranged orthogonally in the sides of the outside surface 15 of the pyramid 11 through countersunk bore holes. In addition, a partial widening of the central opening 13 has been incorporated in the base surface 16 of the pyramid 11 as a lower or rear access 17 to the conical recesses 23. This results in the advantage, particularly when fastening the spherical segments 3 (after adjustment of the latter), that, on the one hand, no air and no excess material of a connection layer 38 (e.g., glue) can accumulate beneath the spherical cap 32 due to the closed line 37 of contact points 36 and that, on the other hand, there is an access point for curing or melting the connection layer 38 in the conical recess 23 below the spherical cap 32 of the reflecting spherical segment 3.

Figure 5:
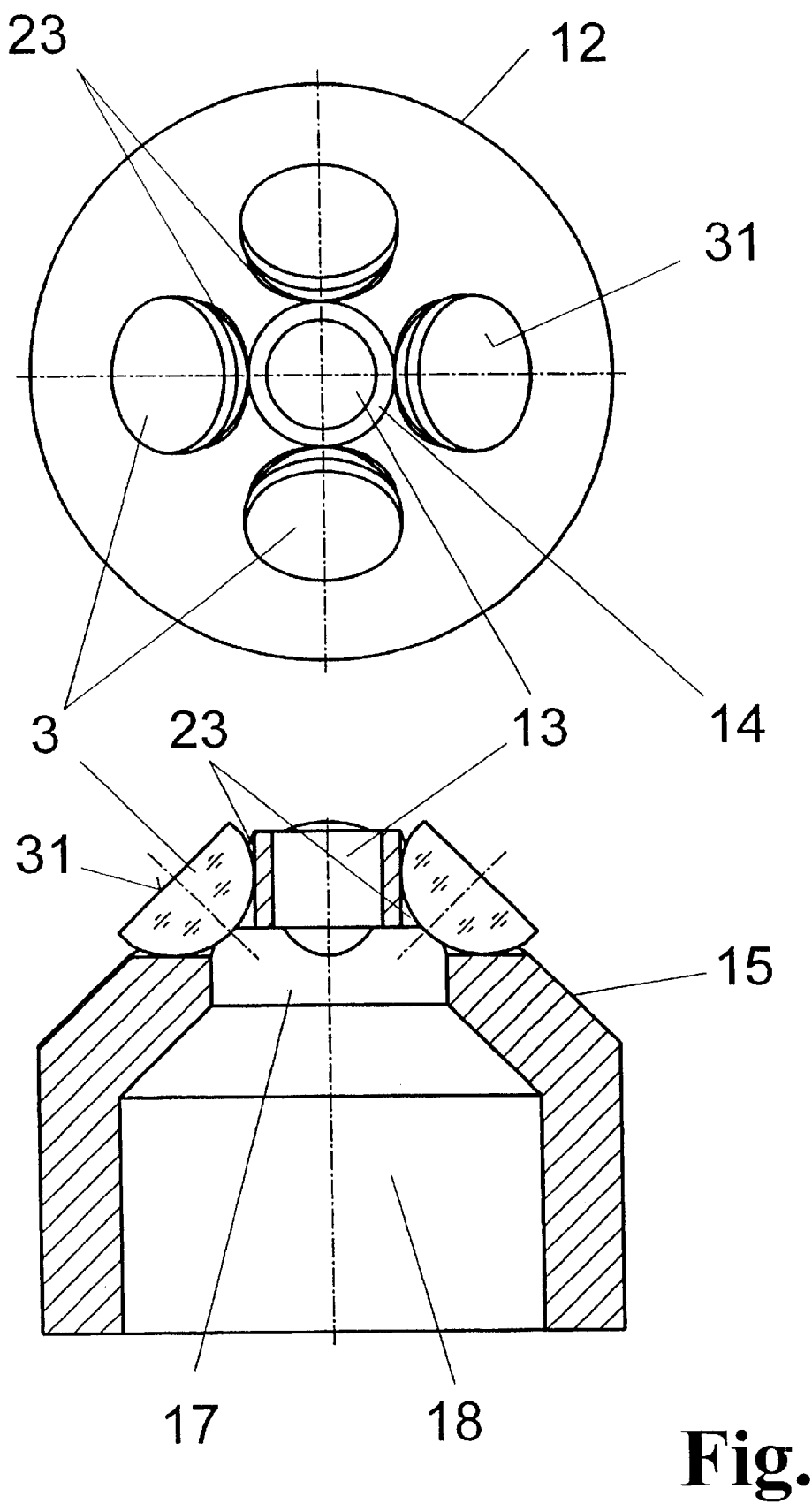
FIG. 5 is a sectional top view showing the base body in the form of a cone.

FIG. 5 shows a construction of the arrangement of the reflecting spherical segment 3 which is very similar to FIG. 4. However, in this case, the base body 1 has the shape of a cone 12. The outside surface 15 is likewise suitable for arranging the conical recesses 23 through vertical bore holes in the surface of the cone 12 when the outside surface 15 is inclined in a manner required for orientation of the mirror normals 34 of the mirror surfaces 31 in order to deflect the incident light bundle 4 in the desired directions of the optical axes 51. The incident light bundle 4 should be directed in the same way as that described in FIG. 4 to the base body 1, namely, to the part of the outside surface 15 of the cone 12 covered by the mirror surfaces 31. In this case, the mirror surfaces 31 are also aligned in such a way that the reflected light bundles 5 form optical axes 51 extending within a plane and are again orthogonal to one another in pairs.

Figure 6:
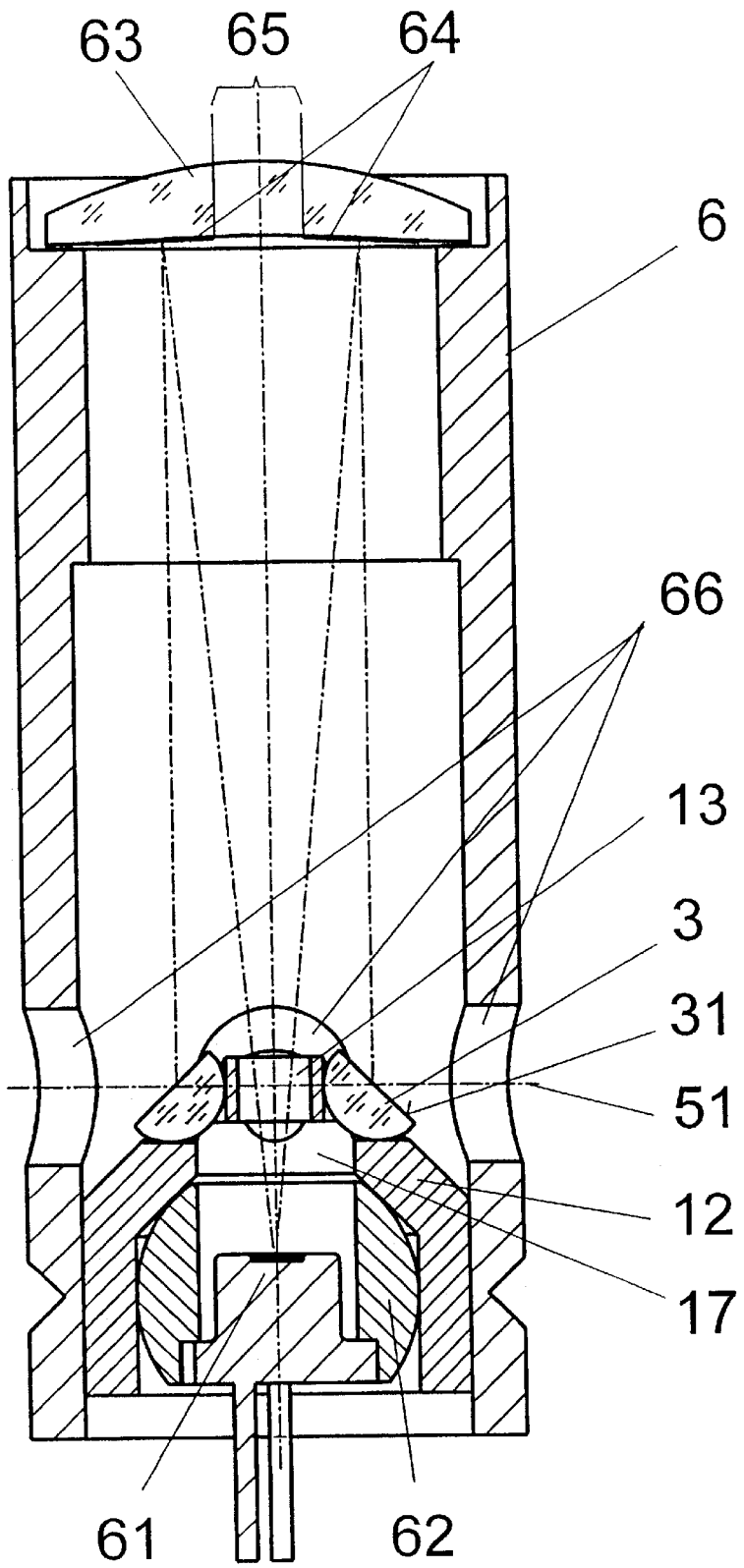
FIG. 6 shows an application of the arrangement, according to the invention, as a 5-axis plummet.

In contrast to the inner shape of the base body 1 shown in FIG. 4, the cone 12 which constitutes a simple rotationally symmetric body (e.g., rotating part) is lengthened cylindrically and has, in continuation of the cylindrical central opening 13 and the expanded access 17 to the recesses 23, a countersunk bore hole 18 with increased diameter. This countersunk bore hole 18 produces a hollow space which can receive a suitably dimensioned spherical shape so as to be supported in rotatable manner on a circular contact line virtually without play. With reference to FIG. 6, this step is applied especially for accommodating an adjustable holding arrangement for the light source.

FIG. 6 uses the base body 1, shown in FIG. 5, which is constructed as a cone 12 for realizing a 5-axis plummet 6. For purposes of adjusting a light source 61, a spherical holder 62 is provided in the hollow space which is formed as a countersunk bore hole 18 and which has already been described with reference to FIG. 5. The spherical holder 62 can be aligned in any desired manner with respect to its radiating characteristic in such a way that its slightly divergent bundle is reflected back onto the mirror surfaces 31 as a parallel (collimated) incident light bundle 4 by means of a reflecting collimator 63 arranged above the tip of the cone 12. In this application of the arrangement according to the invention, the collimator 63 is a collimator objective in which a mirror layer 64 is arranged on a lens surface and has, in its central area, a window 65 which lets through a (likewise collimated) portion of the light bundle coming from the light source 61. The window 65 can be either circular or square. The square shape is advantageous precisely when it is aligned with its side edges parallel to the directions of the four orthogonally oriented optical axes 51 of the reflected light bundles 5. In this way, an additional cross pattern can be generated on the projected image of the window 65 through diffraction phenomena, this cross pattern being oriented parallel to the reflected optical axes and can be used as an additional alignment means for the 5-axis plummet 6.

The portion of the light from the light source 61 reflected at the collimator 63 by its mirror layer 64 is collimated, simultaneously directed to all four reflecting spherical segments 3 and deflected by 90° by the associated mirror surfaces 31. The reflection takes place exactly as was described already in FIG. 4 and FIG. 5, so that optical axes 51 which are orthogonal to one another occur within a plane. These light bundles 5 which are reflected in this way and which have an approximately circular cross section due to the completely reflecting circular section face of every spherical segment 3 are guided outward through exit window 66 through the wall of the 5-axis plummet 6, where they are available (together with the fifth axis which is generated by the portion of the light source bundle transmitted through the collimator 63) as four orthogonal optical axes 51 for measurement tasks.

Figure 7:
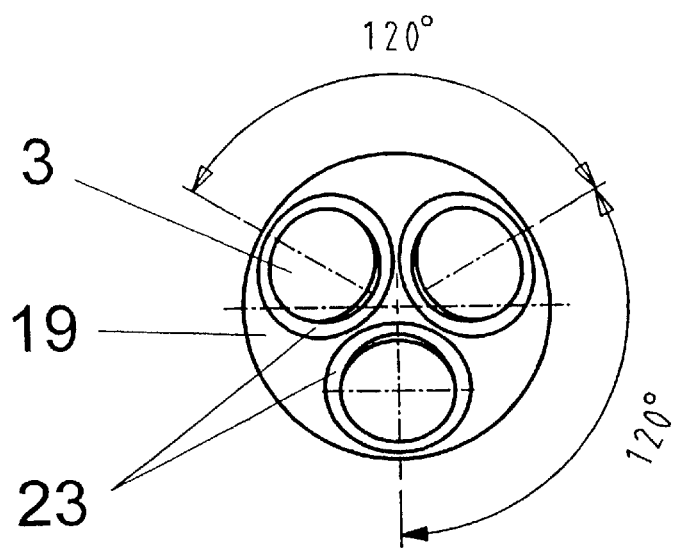
FIG. 7 shows a top view of a base body with three uniformly distributed mirror surfaces.
Figure 8:
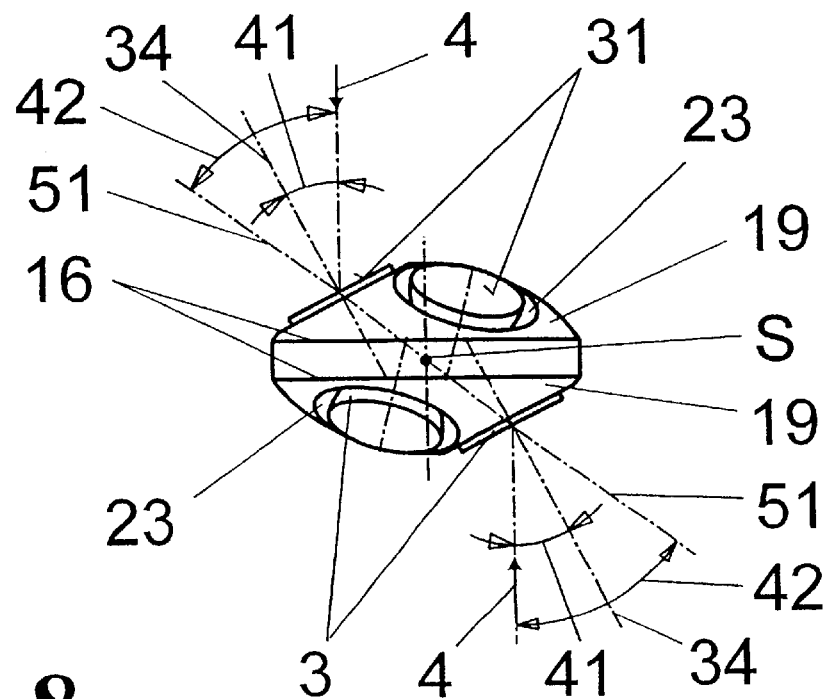
FIG. 8 shows the construction of a 6-axis plummet in the arrangement of two congruent partial bodies according to FIG. 7.
Figure 9:
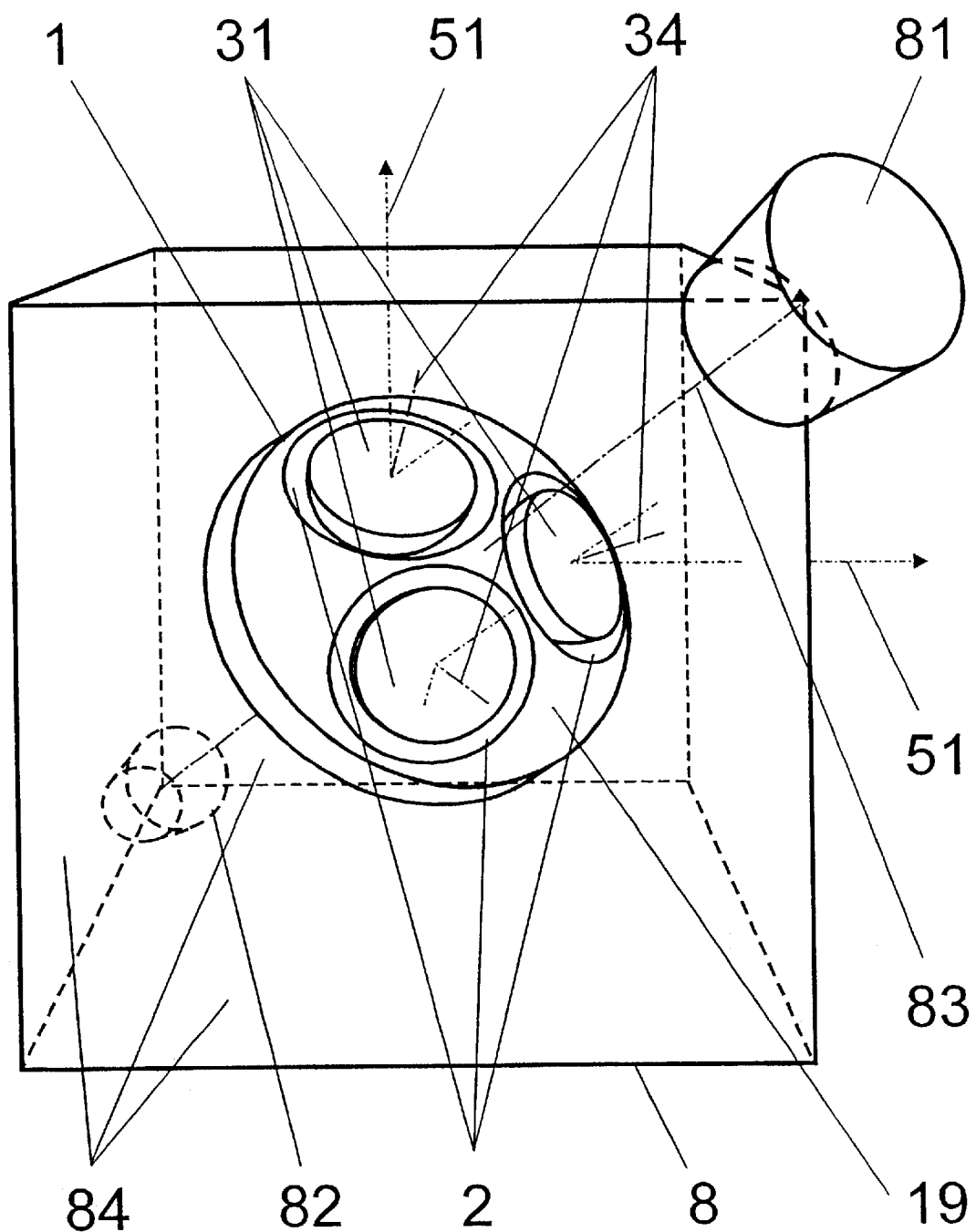
FIG. 9 shows a perspective view with reference to FIG. 8.

The variant of the arrangement, according to the invention, shown in FIGS. 7 to 9 is intended for a 6-axis plummet. The mirror carriers in the form of spherical segments 3 with mirror layers on their section faces are of the same type as in the preceding examples. The spherical cap 32 of every spherical segment 3 is again embedded in a conical recess 23 of the base body 1. The base body 1 can again have the preferred shape of a cone 12 or the shape of a spherical segment. Instead of the shape of a cone 12 or spherical segment, regular pyramids with 3n sides could also be used, where $n \geq 1$, although the choice of rotationally symmetric bodies is preferable (primarily because of simpler production).

The construction of the invention according to FIGS. 7 to 9 differs in that the base body 1 is a double-body comprising two congruent partial bodies 19, wherein the partial bodies 19 have plane base surfaces 16 which are arranged so as to face one another and so as to be parallel to one another and the center axes of both partial bodies 19 lie on a straight line.

FIG. 7 shows a top view of one of the partial bodies 19. Three conical recesses 23 are arranged in every partial body 19 (which can have the shapes that have already been discussed, i.e., cone 12, three-sided pyramid 11, spherical segment or other rotationally symmetric shapes) in such a way that the recesses 23 are arranged so as to be offset by 120° about the center axis of the partial body 19. The other partial body 19 (not shown) which extends below the drawing plane is arranged as though it were rotated by 180° around the horizontal dash-dot line in FIG. 7. As a result, the reflecting spherical segments 3 of the cone situated below the drawing plane are arranged so as to be rotated by 60° relative to the cone 12, shown from the top, within the drawing plane. The purpose of this arrangement of the two partial bodies 19 relative to one another can be seen in FIG. 8 and is described more fully in the following.

As can be seen from FIG. 8, the two partial bodies 19 (shown here as two spherical segments) are joined to form a unitary base body 1 in such a way that the mirror surfaces 31 have, as a pair, parallel mirror normals 34. The two mirror surfaces 31 with the parallel mirror normals 34 are to be aligned subsequently in the associated conical recesses 23 in such a way that the light bundles 5 reflected by their mirror surfaces 31 form a virtual intersection point S of their optical axes 51 in the interior of the base body 1, wherein the partial bodies 19 are illuminated by two light bundles 4, which are directed in opposite directions to one of the partial bodies 19, respectively, and which impinge parallel to the common center axis. As a result of all pairs of mirror surfaces 31 defined in this way, the entirety of all light bundles 5 reflected on the six mirror surfaces 31 forms a virtual intersection point S of all optical axes 51 in the interior of the base body 1. In this configuration, the incident angles 41 of the light bundle 4 impinging on each of the partial bodies 19 are so adjusted relative to each mirror surface 31 that the double incident angle 42 together with the 120-degree offset of the reflected light bundles 5 about the center axis of the partial body 19 results in an orthogonal alignment of the optical axes 51 relative to one another. The angle of incidence 41 is also preferably used as a measure of the inclination of the outside surface 15 of the partial body 19 (at least in the area of the recesses) so that the mirror surfaces 31 virtually form a tangential plane to the outside surface 15 as far as possible and the total arrangement therefore remains compact.

FIG. 9 shows the compact construction from FIG. 8 again in a perspective view which illustrates the angle relationships of the incident and reflected light bundles 4 and 5 in a different manner.

The 6-axis plummet based on the configuration in FIGS. 7 and 8 with six optical axes 51 orthogonal to one another, three of which are generated as an orthogonal system (mathematical tripod) by the mirror surfaces 31 of a partial body 19, requires very precise angle adjustments for illumination and the partial bodies 19. For this reason, it is particularly advantageous that a 6-axis plummet of this type is constructed with a housing in the form of a cube 8. Light sources 81 and 82 are oriented along a body diagonal 83 of the cube 8 at the cube corners connected in this way such that the collimated light bundles radiated from them are directed to the base body 1 located in the cube center. The base body 1 with its two partial bodies 19, only one of which, the partial body 19 facing the front light source 81, is visible in FIG. 9, is likewise oriented to the body diagonal 83 in that the center axes of its partial bodies 19 extend along this body diagonal 83. The center of the base body 1 is located in the center of the cube 8. In accordance with the description relating to FIG. 8, the mirror surfaces 31 are fastened with their mirror normals 34 in the recesses 2 of the respective partial body 19 in such a way that all optical axes 51 of the light bundles 5 reflected by the mirror surfaces 31 have a virtual intersection point S (shown only in FIG. 8) which is the center of the base body 1 and of the cube 8 simultaneously. The optical axes 51 generated by reflection at the mirror surfaces 31 exit from the cube surfaces 84 adjacent to the respective light sources 81 and 82 orthogonally and centrally for each light source 81 and 82. The exit windows required for this purpose are not shown in FIG. 9 for the sake of clarity.

The method, according to the invention, for generating a plurality of optical axes 51 which are aligned in a defined manner relative to one another from a collimated incident light bundle 5 of a light source 61 comprises the following basic series of steps:

producing carrier bodies for mirror surfaces 31, wherein spheres are divided into spherical segments 3 by plane cuts, arranging a mirror layer 31 on the section face of the spherical segments 3, producing a base body 1 for the reflecting spherical segments 3, wherein a recess 2 is introduced in the surface of the base body 1 for every optical axis 51 to be aligned in a shape such the spherical segment 3 is supported so that it is not displaceable but is rotatable about the center of curvature of the spherical cap 32, arranging a connection layer 38 on at least one of the surfaces of the spherical cap 32 and recess 2, wherein the connection layer 38 is used for subsequent rigid fixation of the two surfaces with respect to one another, embedding the spherical segments 3 with their spherical caps 32 in the recesses 2 of the base body 1, aligning the individual mirror surfaces 31 by means of a master template 7 by which the desired directions of the optical axes 51 are effected through alignment surfaces 72 for the mirror surfaces 31, and fixing the reflecting spherical segments 3 in the area of the contact points 36 between the spherical cap of the spherical segment 3 and the outside surface 25 of the recess 2 through rigid connection by means of the connection layer 38.

Figure 10:
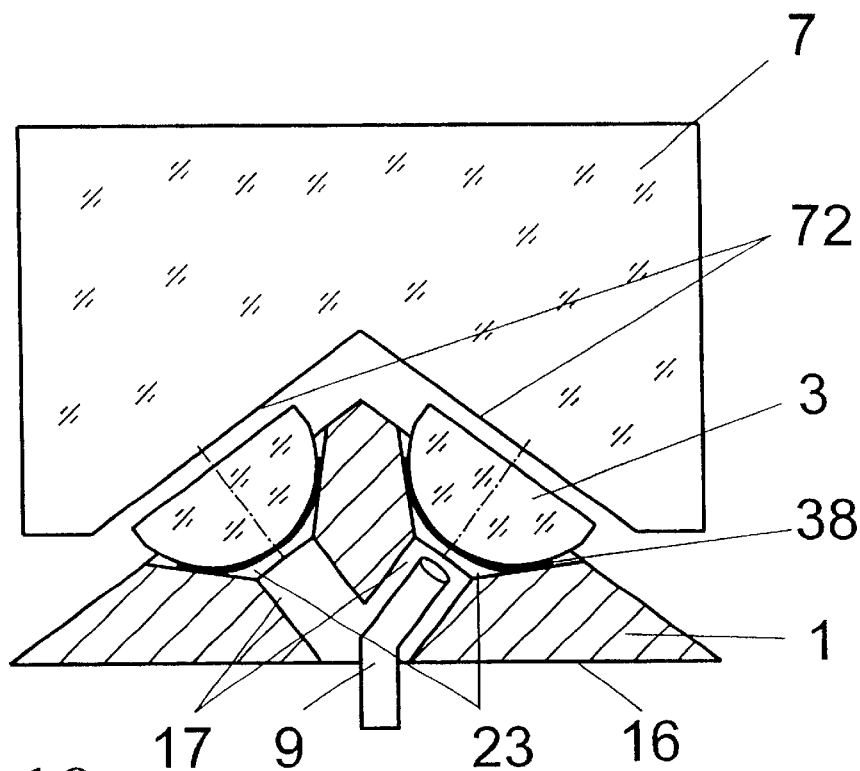
FIG. 10 shows a schematic illustration of the method according to the invention.

FIG. 10 is a schematic illustration of the method in which the step for producing the base body 1, for which a three-sided prism was selected for the sake of simplicity, is concluded already by introducing conical recesses 23 through countersunk bore holes and creating accesses 17 (provided with reference numbers only in FIGS. 4 and 5). The carriers for the mirror surfaces 31 are likewise produced already as spherical segments 3 in semi-spherical size, provided with a connection layer 38 (glue) (e.g., by dipping the spherical caps 32 in glue) and placed in the recesses 23. The connection layer 38, for which a UV-hardening epoxy is used in this example, is initially still malleable and holds the spherical cap of the spherical segment 3 so as to be rotatable. At this point in time, a master template 7 which has been fashioned beforehand with high precision is fitted in a defined manner relative to the base surface 16 of the base body 1, so that the mirror surfaces 31 are brought into parallel position to the alignment surfaces 72 of the master template 7 by means of a slight pressure. When the same master template 7 is used, this procedure ensures for all steps for fitting base bodies 1 fashioned beforehand in this way and reflecting spherical segments 3 that the mirror surfaces 31 of the spherical segments 3 are always aligned in precalculated angles relative to one another and relative to the direction of the incident light bundle 4 (not shown) provided vertical to the base surface 16. When the master template 7 is correctly fitted accompanied by a slight pressure, a UV-light source 9 which cures the connection layer 38 is introduced through the accesses 17 to the conical recesses 23 and accordingly permanently fixes the spherical segments 3.

Instead of the UV-curable glue, many other glues which ensure adequate movability of the spherical segments 3 for the adjusting process by means of the master template 7 before they cure (as quickly as possible) can also be used. In this case, air-drying glues are also conceivable in that an air nozzle is inserted via the access 17 in the base body 1 instead of the UV light source 9 shown in FIG. 10 for faster curing.

Another set of possibilities for the connection layer 38 is opened up by arranging two partial layers on each of the surfaces, namely, the spherical cap 32 of the spherical segment 3 and the outside surface 25 of the recess 2. In addition to metallic coatings which are subsequently melted together by laser soldering or welding (at least at contact points 36), plastic layers which are melted by applying energy (radiation or heat via the access 17 in the base body 1) or which enter into some other type of rigid connection are also suitable.

Figure 11:
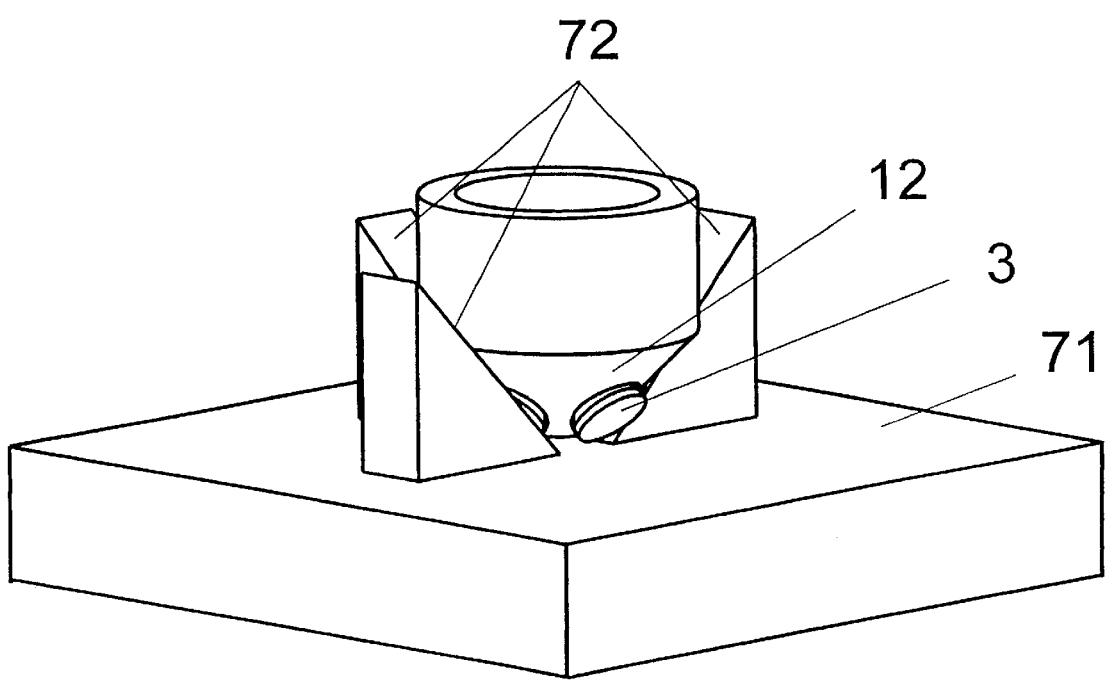
FIG. 11 shows the orientation of the mirror surfaces at a base body for a multiple-axis plummet.

In a modification of the method described above with reference to FIG. 10 at the same stage of prefabrication of the base body 1 and spherical segments 3, FIG. 11 shows a master template 7 with a template carrier 71 below it on which three aligning surfaces 72 are arranged. This type of master template 7 is particularly relevant for mirror carriers (base body 1) with more than two reflecting spherical segments 3. In this case, it should be noted that even with more than three spherical segments 3 there are only three aligning surfaces 72 on the template carrier 71, because it is only in this case that an overdetermination of the surface pairs that are placed and pressed on (mirror surfaces 31 and aligning surfaces 72) is avoided. The surface of the unaligned spherical segment 3 that is completely visible in FIG. 11 is then not permanently fixed until a second step in which the master template 7 is pressed on. For this purpose, the master template 7 is arranged so as to be rotated by 90° after the hardening of the connection layer 38 at the first three mirror surfaces 31, so that two spherical segments 3 which have already been aligned are used for aligning the next mirror surface 31 (of the next spherical segment 3). Accordingly, this also ensures exact alignment in a reproducible manner While the foregoing description and drawings represent the present invention, it will be obvious to those skilled in the art that various changes may be made therein without departing from the true spirit and scope of the present invention.

List of reference numbers

1 base body
11 pyramid
12 cone
13 central opening
14 top surface
15 outside surface (of the base body)
16 base surface
17 access to the recesses
18 countersunk bore hole
19 partial body
2 recess
21 cylindrical recess
22 pyramid-shaped recess
23 conical recess
24 center axis
25 outside surface (of the recess)
3 spherical segment (mirror carrier)
31 mirror surface
32 spherical cap
33 axis of symmetry
34 mirror (surface) normal
35 center of curvature
36 contact points
37 line of contact points
38 connection layer
4 incident light bundle
41 incident angle
5 reflected light bundle
51 optical axis
6 5-axis plummet
61 light source
62 holder
63 collimator
64 mirror layer
65 window
66 exit window
7 master template
71 template carrier
72 alignment surfaces
8 cube
81, 82 light sources
83 body diagonal
84 cube surfaces
9 UV light source
S virtual intersection point

What is claimed is:

1. An arrangement for generating a plurality of optical axes oriented in a defined manner relative to one another in which the optical axes are defined by the reflection angles of a light bundle at plane mirror surfaces arranged in different ways, comprising:

spherical segments having a section face upon which said plane mirror surfaces are arranged;

every spherical segment always including a spherical cap and a circle face;

an axis of symmetry of the spherical segment extended beyond the circle face being a mirror surface normal;

every spherical segment being embedded with its spherical cap in a recess of a base body;

said recess having a center axis, which is essentially adapted to a direction of the mirror surface normal required for orientation of the optical axis, and an outside surface, and there are contact points between the spherical cap of the spherical segment and the outside surface of the recess;

said contact points constituting an invariable pattern of contact points which is not dependent on the orientation of the mirror surface; and said spherical segments being rigidly fixed in the recesses of the base body, at least at the contact points, by a connection layer, wherein the plane mirror surfaces can be adjusted with the desired degree of accuracy prior to the final fixation of the connection layer corresponding to the optical axes to be aligned.

2. The arrangement according to claim 1, wherein every spherical segment is provided with a mirror layer over the entire surface of its plane section face.

3. The arrangement according to claim 2, wherein a mirror layer is vapor-deposited on the section face.

4. The arrangement according to claim 1, wherein the section face is covered by a mirror layer, wherein a sharply defined edge area is provided as a diaphragm for limiting the reflected light bundle.

5. The arrangement according to claim 1, wherein the spherical segments are half-spheres.

6. The arrangement according to claim 1, wherein the recesses are conical, wherein the invariable pattern of contact points between the outside surface of the conical recess and the spherical cap of an embedded spherical segment is a closed circular line.

7. The arrangement according to claim 1, wherein the recesses are pyramid-shaped, wherein the invariable pattern of the contact points are the corner points of a plane n-angle which are located on a surface line of the lateral surfaces of the pyramid-shaped recess.

8. The arrangement according to claim 7, wherein the recesses are three-sided pyramid-shaped recesses, wherein the contact points are corner points of a triangle which are arranged on a surface line of the three lateral surfaces of the pyramid-shaped recess.

9. The arrangement according to claim 1, wherein, for every optical axis to be aligned, the base body has a surface portion for arranging said recess, wherein the surface normal of the surface portion in the area of the recess is essentially adapted to the required direction of the mirror surface normals for orientation of the optical axes.

10. The arrangement according to claim 9, wherein the base body for generating a plurality of beam bundles within a plane orthogonal to the direction of the incident light bundle is a cone, wherein the conical recesses are arranged in the outside surface of the cone so as to be distributed in a desired manner.

11. The arrangement according to claim 10, wherein for simultaneous illumination of all of the mirror surfaces located on the outside surface of the base body, a light source is provided which has a collimated light bundle extending symmetrically along the axis of symmetry of the base body, wherein the light source is arranged above the tip of the base body.

12. The arrangement according to claim 10, wherein for simultaneous illumination of all of the mirror surfaces located on the outside surface of the base body, a light source is provided below the outside surface, wherein the base body has a central symmetric opening through which the beam bundle of the light source is directed, and a collimator which reflects the beam bundle proceeding from the light source onto the mirror surfaces in a collimated manner is arranged above the tip of the base body.

13. The arrangement according to claim 12, wherein the collimator is a collimator objective which is provided for collimating incident light for both transmission and reflection.

14. The arrangement according to claim 13, wherein the collimator objective has a mirror layer on a lens surface, wherein the mirror layer has a window in the area of the optical axis of the collimator objective for transmitting a limited light bundle.

15. The arrangement according to claim 14, wherein the window for the transmitted light bundle has a circular opening.

16. The arrangement according to claim 14, wherein the window for the transmitted light bundle has a square opening.

17. The arrangement according to claim 12, wherein the central symmetric opening in the interior of the base body expands in the area of the base surface into a larger cylindrical countersunk bore hole with a conical end for receiving a light source, wherein the light source, which is embedded in a spherical holder for adjustment of the radiating characteristic, is rotatably mounted in this countersunk bore hole.

18. The arrangement according to claim 10, wherein the base body is a truncated cone, wherein an opening is located between the top surface and the base surface so that a central portion of the light bundle proceeding from the light source can pass through unimpeded.

19. The arrangement according to claim 9, wherein in order to align a plurality of beam bundles in different optical axes, the base body has plane surfaces, wherein the plane surfaces are so adapted with respect to their position relative to an incident light bundle that they are essentially parallel to the mirror surfaces to be arranged subsequently.

20. The arrangement according to claim 19, wherein in order to align a plurality of beam bundles within a plane orthogonal to the direction of the incident light bundle, the base body is a pyramid with n sides, where n is the quantity of beam bundles whose optical axes are to be aligned in a plane.

21. The arrangement according to claim 12, wherein the base body is a truncated pyramid, wherein an opening is located between the top surface and the base surface so that a central portion of the light bundle proceeding from the light source can pass through unimpeded.

22. The arrangement according to claim 20, wherein the base body for generating four orthogonal beam bundles which are orthogonal to the direction of the incident light bundle and relative to one another is a straight-line square pyramid.

23. The arrangement according to claim 19, wherein the recesses are cylindrical, wherein the cylindrical recess has a diameter smaller than that of the associated spherical segment, so that the invariable pattern of the contact points is a circle at the upper edge of the cylindrical recess.

24. The arrangement according to claim 1, wherein the base body comprises two congruent partial bodies with plane base surfaces, wherein the partial bodies are arranged along a common center axis, have an outside surface which is inclined relative to the base surface and which is provided for introducing three recesses for the reflecting spherical segments, these recesses being evenly distributed about the center axis of the partial body, the base surfaces of the partial bodies are connected with one another so as to be located opposite one another in a parallel manner such that the center axes of every two recesses situated in different partial bodies are arranged along one and the same straight line, and the optical axes of the reflected light bundles of all reflecting spherical segments have a common virtual point of intersection, wherein the reflecting spherical segments in every partial body are illuminated by a light source having a collimated incident light bundle along the common center axis of the partial bodies.

25. The arrangement according to claim 24, wherein the base body comprises two rotationally symmetric partial bodies with plane base surfaces.

26. The arrangement according to claim 25, wherein the base body comprises two cones.

27. The arrangement according to claim 25, wherein the base body comprises two spherical segments.

28. The arrangement according to claim 24, wherein the base body comprises two three-sided pyramids, wherein the parallel base surfaces of the pyramids are rotated by 60° relative to one another about the common center axis of the partial bodies.

29. The arrangement according to claim 24, wherein a housing in the shape of a cube is arranged around the base body, wherein the base body is positioned with its center axis along a body diagonal of the cube and point-symmetric with respect to the center of the cube, and two collimated, opposing light sources are provided for illuminating the mirror surfaces of a respective partial body of the base body, wherein the mirror surfaces of every partial body are so aligned that each optical axis of the light bundle reflected by the mirror surfaces of a partial body orthogonally traverses a cube surface adjacent to the associated light source.

30. A method for generating a plurality of optical axes that are oriented in a defined manner relative to one another, in which a reflected light bundle is generated from a collimated incident light bundle proceeding from a light source through the orientation of adjustable plane mirror surfaces, wherein the direction of the optical axes is adjusted by means of the reflection angle of the respective mirror surface relative to the incident light bundle, comprising the following steps:

producing carrier bodies for mirror surfaces, wherein spheres are divided into spherical segments by plane cuts, resulting in spherical segments with a spherical cap and a circular surface;

arranging a mirror layer on the circular surface of the spherical segments, wherein the axis of symmetry of the spherical segment above the mirror surface is a mirror surface normal with respect to the optical axis to be aligned;

producing a base body, wherein a recess with a center axis and an outside surface is so introduced in the surface of the base body for every optical axis to be aligned that the center axis of the recess is adapted at least approximately to the direction of the mirror surface normal required for the orientation of the optical axis, and the shape of the recesses is selected in such a way that the spherical segment is supported so that it is not displaceable but is rotatable about the center of curvature of the spherical cap;

arranging a connection layer on at least one of the surfaces of the spherical cap and recess, wherein the connection layer is used for subsequent rigid fixation of the two surfaces;

embedding the spherical segments with their spherical caps in the recesses of the base body;

aligning the different mirror surfaces by a master template by which the desired orientations of the optical axes are effected through alignment surfaces for the mirror surfaces; and fixing the reflecting spherical segments in the area of the contact points between the spherical cap of the spherical segment and the outside surface of the recess through rigid connection by the connection layer.

31. The method according to claim 30, wherein the recesses are introduced in the base body conically through countersunk bore holes and the spherical segments are fixed along a circle line of contact points at the outside surface of the conical recess.

32. The method according to claim 30, wherein the recesses are introduced in the base body through cylindrical bore holes with a diameter that is smaller than the circular face of the spherical segment and the spherical segments are fixed to the upper edge of the outside surface of the cylindrical recess along a circular line of contact points.

33. The method according to claim 30, wherein the recesses are introduced already during the production of the base body by forming three-sided pyramids, and the spherical segments are fixed with their spherical caps at a contact point to each outside surface of the pyramid.

34. The method according to claim 30, wherein in order to fix the spherical segment in the recess, a glue is applied at least to the contact points on one of the surfaces of the spherical cap or outside surface of the recess.

35. The method according to claim 34, wherein a glue which can be cured through application of energy is applied to one of the surfaces of the spherical segment or outside surface of the recess.

36. The method according to claim 35, wherein the glue is cured by a UV light source from the underside of the spherical segments through an access to the recesses which is arranged centrally in the base body.

37. The method according to claim 30, wherein at least the points of contact between the surfaces of the spherical cap and recess are provided with a coating which can be melted by the application of energy.

38. The method according to claim 37, wherein at least areas around the contact points of the surfaces of the spherical cap and recess are provided with a metallic coating, wherein the metallic coatings of both surfaces are melted together by laser soldering.

39. The method according to claim 30, wherein a maximum of three alignment surfaces are brought into contact with the provided mirror surfaces simultaneously by pressing on the master template for aligning the mirror surfaces before the mirror surfaces that are aligned in this way are deliberately made to rigidly connect the contact points by means of the connection layer introduced between the associated surfaces of the spherical cap and recess.

40. The method according to claim 39, wherein in order to align more than three mirror surfaces relative to one another after three mirror surfaces have been fixed, every additional mirror surface is adjusted and subsequently fixed by reference to two mirror surfaces which have already been fixed.

* * * * *